United States Patent

[11] 3,619,207

[72] Inventors  Joseph W. Dzurik
              Green Township, Hamilton County;
              Eddy R. Hair, Colerain Township,
              Hamilton; Michael E. Hardy, Cincinnati;
              Edward R. Purves, Forest Park, all of Ohio
[21] Appl. No. 850,049
[22] Filed     Aug. 14, 1969
[45] Patented  Nov. 9, 1971
[73] Assignee  The Procter & Gamble Company
              Cincinnati, Ohio

[54] PEANUT BUTTER CONTAINING HOMOGENIZED PEANUT PASTE
14 Claims, 2 Drawing Figs.

[52] U.S. Cl. .................................................. 99/128
[51] Int. Cl. .................................................. A23l 1/38
[50] Field of Search ...................................... 99/128,
                                                126, 98; 241/5, 6

[56]            References Cited
           UNITED STATES PATENTS
2,511,115  6/1950  Lazier et al. .................. 60/39.11
2,847,167  8/1958  Szasz .......................... 241/5
2,911,303  11/1959 Rowland et al. ............... 99/128
3,115,412  12/1963 Schoppe et al. ............... 99/128 X
3,129,102  4/1964  Sanders ....................... 99/128 X
3,265,507  8/1966  Japikse ....................... 99/128
3,278,314  10/1966 Colby ......................... 99/128
3,307,790  3/1967  Cohn et al. ................... 241/5

OTHER REFERENCES
Peanuts: Production, Processing, Products by J. Woodroof AVI Publishing Company, 1966 pp. 141 & 155

Primary Examiner—Frank W. Lutter
Assistant Examiner—Steven L. Weinstein
Attorneys—Edmund J. Sease and Richard C. White ABSTRACT: A peanut paste ingredient for peanut butter has a maximum particle size of no more than 80 microns and has more than 50 percent of its particles in the 8–20 micron range. The best method for preparing this ingredient is by further size-reducing ground peanuts in a homogenizer utilizing particular pressures. The paste can contain more peanut skins than typical commercially available peanut butters contain and can be used in sweet peanut butter products without appearance or taste disadvantages.

INVENTORS
Joseph W. Dzurik
Eddy R. Hair
Michael E. Hardy
Edward R. Purves

BY *[signature]*
ATTORNEY

PEANUT BUTTER CONTAINING HOMOGENIZED PEANUT PASTE

BACKGROUND OF THE INVENTION

Peanut butter is ordinarily composed of peanut paste (that is, size-reduced roasted peanuts), stabilizer, and optionally of emulsifier, sweetener, salt and other ingredients. This invention relates first of all to a novel particle-size peanut paste. It further relates to are advantageous method for preparing this paste. It also relates to a sweet peanut butter product containing the novel paste. It also relates to a peanut butter having a peanut paste ingredient containing a higher weight percentage of peanut skins than do typical commercially available peanut butters. Conventional peanut paste, that is the peanut paste ingredient in typical commercially available peanut butters, has a maximum particle size*

*Particle size is measured herein in terms of equivalent diameter. In other words, particle size is defined herein as the diameter of a spherical particle with a displacement equivalent to that of the particle being measured. of 250 microns or larger, and has about 45 percent of its particles in the 8–20 micron range. The use of peanut paste with a smaller particle size than this as an ingredient in a peanut butter provides a peanut butter which compared to typical commercially available peanut butters is smoother and glossier, melts more quickly in the mouth, and has a better appearance in the sense that it contains fewer visible specks of peanut skins. However, a peanut butter having a peanut paste ingredient with a very small particle size such as that described at column 4 of Lazier et al., U.S. Pat. No. 2,511,115, has a tendency to stick to the roof of the mouth, requiring large amounts of emulsifier to cure this defect.

Peanut paste is conventionally prepared by grinding roasted blanched peanuts. A conventional peanut grinder consists of a rotor member and a stator member, each containing teeth which are in close relationship but not touching each other. Peanuts are fed between the stator and the rotating rotor and are size reduced by shear forces. A conventional grinder is not capable of size reducing peanuts to provide a peanut paste having a particle size much less than conventional peanut paste has unless the paste is subjected to several passes through the grinder. This several-pass process can heat up peanut paste to excessively high temperatures which destroy flavor notes desired in the ultimate peanut butter product. This high-temperature effect can only be overcome by utilizing elaborate cooling methods.

Equipment other than a conventional grinder that has been used for peanut size reduction to provide peanut paste include colloid mills, attrition mills, disintegrators and hammer mills. These size reducers have the same defects as conventional peanut grinders, namely, they require several passes to achieve required lesser than conventional peanut paste particle size, and they heat up peanut paste to excessive temperatures unless elaborate cooling steps are taken.

Another type of size reducer sometimes used to produce peanut paste is an ultrasonic device. The use of an ultrasonic device to size reduce peanuts is described in *Food Engineering*, Dec., 1957 at page 100. Ultrasonic devices do not give peanut paste particle sizes much smaller than conventional sizes.

In the size reduction of roasted peanuts, the terms "homogenizer" or "homogenization" are often used. These terms are generally not used in any specific sense, but cover a wide variety of peanut processing operations. For example, the term "homogenizing" in peanut butter operations is often utilized to mean "well mixed" in the sense that the peanut paste and other peanut butter ingredients, after conventional grinding of the peanuts, are subjected to a mixing operation without further size reduction of the peanuts. In this regard see Beverly, U.S. Pat. No. 3,019,110. At other times the term "homogenizer" is used in the general sense of a grinder, and often no pressure limitations or initial, i.e. prehomogenization, particle size required in order to achieve the desired ultimate peanut paste are specified. In this regard see *Food Manufacture*, Sept. 1958, at page 361; Woodruff, J.G. *Peanuts, Production, Processing, Products*, The Avi Publishing Company (Westport, Conn., 1966), at page 140; *Glass Packer/Processor*, July 1967 at page 19; Rosenfield et al. U.S. Pat. No. 2,397,564; and Mitchell, U.S. Pat. No. 2,511,119. All these disclosures of "homogenizers" are indefinite and it is not clear that any of this equipment size reduces to produce a lesser than conventional particle-size peanut paste without some disadvantage accruing.

Many peanut butter brands ordinarily contain 1–3 percent added sweetener, usually sucrose. Sweet products, that is, peanut butters containing more than this amount of added sweetener, are sometimes deemed desirable. If a decision is made to convert an already existing peanut butter process comprising conventional grinding equipment and utilizing 1–3 percent added sweetener to a process wherein higher amounts of added sweetener, for example, 4–10 percent added sucrose are utilized, the higher viscosity of the processing stream due to the additional sweetener ordinarily requires the replacement of the existing pumps with higher pressure pumps and also larger agitator motors in mixing tanks to handle the increased load.

In the blanching process previously mentioned most of the peanut skins are removed from the peanuts previous to the time they are ground. Ordinarily the peanuts which are subjected to grinding contain no more than about 0.75 percent by weight peanut skins. The skins are size reduced in the grinding step together with the peanuts. Despite the fact that these skins are size reduced some particles of them are visible in the peanut butter product and are known in the trade as "specks." Grinding peanuts containing more than the 0.75 percent peanut skins mentioned above in a conventional process results in bad appearance peanut butter in that it contains excessive specks and also results in a bitter-tasting peanut butter product. Schoeppe et al. U.S. Pat. No. 3,115,412, discloses comminuting nuts to a small particle size and indicates that skins may or may not be removed. The Schoeppe patent does not mention peanuts and does not disclose any method of overcoming the bitter taste problem normally associated with excess skins.

SUMMARY OF THE INVENTION

It has been found that peanut butter which is smoother, glossier, has fewer specks and melts more quickly in the mouth than peanut butter made from conventional particle-size peanut paste and which has acceptable stickiness characteristics is achieved when the peanut paste constituent of the peanut butter has a maximum particle size of no more than 80 microns and has more than 50 percent of its particles in the 8–20 micron range.

It has further been found that the best method of preparing this peanut paste ingredient is by treating peanut paste which has been initially size reduced to a particular particle size, in a homogenizer of the type described at pages 1167–68 of Perry's *Chemical Engineers Handbook* (3d ed.), utilizing particular pressures. This piece of equipment and the use of these pressure and initial size limitations allows size reduction to the proper range with a single pass. Moreover, this piece of equipment does not impart to the peanut paste the previously discussed flavor-destructive high temperatures. Moreover, this piece of equipment does not require the use of more than a minimal amount of extra cooling capacity in comparison with the elaborate cooling systems required by other size reducers.

It has further been found when the novel peanut paste described above is used in a sweet peanut butter product that the viscosity of the process stream is not substantially increased and therefore no replacement of existing pumps or agitator motors is required.

It has further been found that the peanut paste can contain not only 0.75 percent peanut skins or less but even excess skins, that is more than 0.75 percent peanut skins and up to 5 percent skins by weight of the paste, when the paste has been treated by the homogenizing process described above, without excessive amounts of specks appearing in the product. Moreover, when a paste containing excess skins is utilized in a sweet peanut butter product, the bitter aftertaste normally imparted by the excess skins is diminished or eliminated completely.

DETAILED DESCRIPTION OF THE INVENTION

Figure 1:
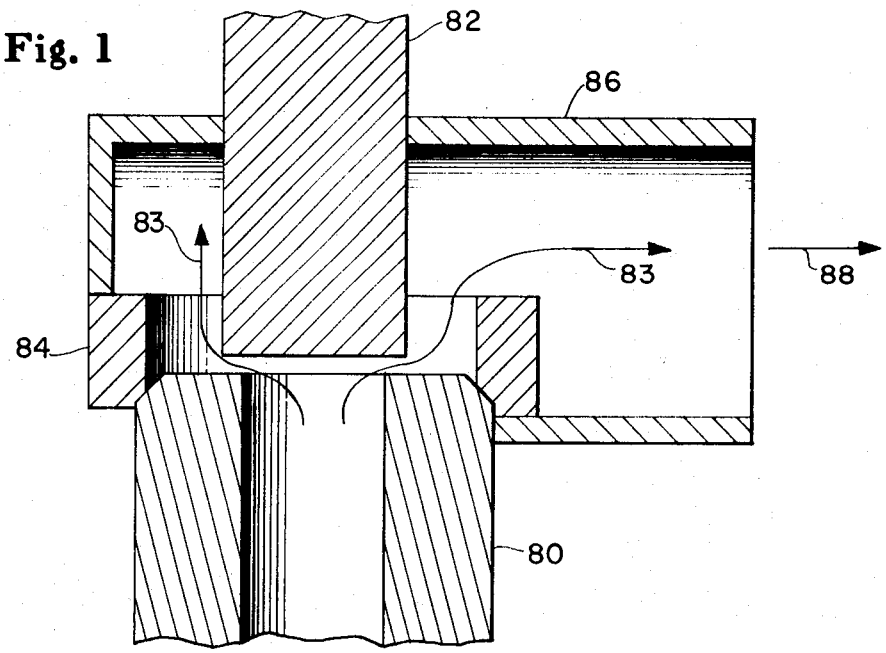
FIG. 1 is a longitudinal cross section of a simplified representation of the valve, impact ring, and product flow portions of the homogenizer.

Before discussing in detail the invention herein, it is deemed desirable to discuss conventional peanut butter formulations and processes so that the invention herein will be more understandable. As previously stated, peanut butter is ordinarily comprised of peanut paste, stabilizer, and optionally of other ingredients such as emulsifier, sweetener, and salt. The peanut butter ordinarily comprises from 75–99 percent by weight peanut paste especially 80–99 percent by weight peanut paste. This ingredient is ordinarily obtained by conventional methods of roasting and blanching raw peanuts and then grinding them. The resulting peanut paste is a mixture of peanut particles and oil which have been released from the cellular structure of the nuts during the grinding operation. If this product is allowed to stand for a period of time, the oil will separate from the product and will form a separate layer on top and a rigid crumbly mass underneath.

The peanut butter product also ordinarily comprises from 1 percent to 5 percent by weight stabilizer. This stabilizer is normally a hydrogenated fatty material. It is utilized so that layer separation in the peanut paste will not occur. In other words, it stabilizes the peanut paste against separation of oil and solid components. The stabilizer materials can include nearly any edible glyceride fat solid or semisolid. Partially or completely hydrogenated natural fats such as peanut oil, corn oil, cottonseed oil, linseed oil, palm oil, whale oil, and other marine oils, alone or in combination, are very suitable to provide stabilizers. One preferred type of stabilizer is rapeseed oil having an iodine value not greater than about 10; the use of this stabilizer is described in Sanders U.S. Pat. No. 3,129,102. Other preferred stabilizers are described in Japikse U.S. Pat. No. 3,265,507; for example, this patent discloses stabilizer compositions comprising substantially fully hydrogenated soybean oil and substantially fully hydrogenated rapeseed oil in weight ratios from about 3:7 to about 7:3.

A peanut butter composition can optionally comprise from about 0.5 percent to 1.5 percent by weight emulsifiers. These emulsifiers function in the peanut butter composition to negate stickiness so that the peanut butter composition will not stick to the roof of the mouth. Suitable emulsifiers include lecithin and fatty monoglycerides, for example, soybean monoglycerides.

Many peanut butters also comprise from 1–3 percent by weight added sweetener. Sweet peanut butter products ordinarily comprise more than 3 percent by weight added sweetener and usually from 4 percent to 10 percent or more by weight added sweetener. Suitable sweeteners include, for example, sucrose, dextrose, fructose, honey, molasses, saccharin, and other common sweetening agents.

A peanut butter composition can also additionally comprise from 1 percent to 1.5 percent by weight salt as a flavoring agent.

Some unhydrogenated or slightly hydrogenated glyceride oils can also be added as an ingredient in peanut butter to fine tune the consistency of or provide good consistency in the ultimate product. This added oil is distinct from the peanut oil which is present in the peanut paste ingredient. If such added oil is utilized as an ingredient in a peanut butter composition, the composition ordinarily comprises from 0.2 to 7 percent by weight added oil. A vegetable oil, for example peanut oil, or slightly hydrogenated soybean oil, is commonly used for purposes of ultimate product consistency adjustment.

In conventional processing, peanuts having been roasted and blanched, are ground to a particle size hereinabove mentioned for conventional peanut paste. The other peanut butter ingredients can be added before, during, or immediately after the grinding step to provide a homogeneous mixture. It is preferred that the processing stream be maintained in an inert atmosphere, e.g. a nitrogen atmosphere, starting just before the grinding step and continuing throughout the remainder of the process. The homogeneous mixture with its stabilizer components in molten state is subjected to processing to properly crystallize the stabilizer. Ordinarily the stabilizer is in molten state when the homogeneous mixture is at a temperature greater than 100° F. The crystallization is carried out by cooling the homogeneous mixture from this temperature, for example, in a scraped wall heat exchanger and then subjecting the mixture to agitation, for example, in a picker. After being processed through the picker the product is ordinarily introduced into the containers by a filler. After tempering in the containers, it is ready for sale.

Turning now to a detailed description of the present invention and utilizing the above framework, the peanut paste ingredient herein has a maximum particle size of no more than 80 microns and has more than 50 percent, preferably at least 55 percent of its particles with a particle size in the 8–20 micron range. No more than 35 percent of its particles, preferably no more than 30 percent of its particles have a size less than 10 microns. This peanut paste has a particle size smaller than the particle size in conventional peanut paste, but not as small as the particle size disclosed in the previously mentioned Lazier patent. It has been found herein that this novel particle size balances the advantages of additional smoothness, glossiness, rapidity of mouth melt, and speck count with acceptable stickiness. Thus, if the paste has a maximum particle size of more than 80 microns or contains no more than 50 percent of its particles in the 8–20 micron range, there is a sacrifice in smoothness, glossiness, rapidity of mouth melt, and speck count; and if the paste has more than 35 percent of its particles with a size less than 10 microns, the paste is too sticky or requires more emulsifier.

This peanut paste ingredient is utilized in the peanut butter composition in the amounts described above for conventional peanut paste. Except for the peanut size reduction step, a peanut butter product containing this paste can be prepared according to the conventional process described above and can contain amounts of ingredients as described above.

The peanut paste herein can be prepared in a number of ways. For example, it can be prepared by utilizing multiple passes of peanuts through a conventional grinder or other device such as comminuters attrition mills, disintegrators, hammermills, or colloid mills. However, in order to achieve the proper particle size, all these types of devices raise the temperature of some portions of the paste to excessive limits, that is, to a temperature greater than about 300° F., and this temperature rise destroys some desirable flavor in the paste. In order to negate this disadvantage, heat exchangers have to be interspersed between each pass of the material through the size reducers so that there is no heat buildup; the paste must be immediately cooled after size reduction; and preferably the paste must be cooled during size reduction, for example, by cooling coils or by the use of liquid carbon dioxide or other very cold inert agents.

It has been found that the best method of producing the above advantageous peanut paste consists of a two-stage size reduction operation. In the first stage peanuts are size-reduced, for example, in conventional equipment so that the resulting peanut paste contains particles having a maximum particle size on the order of 150 to 300 microns, and has about 40 to 50 percent of its particles in the 8–20 micron range. Preferably, the peanuts are size reduced to produce conventional particle size peanut paste in this first stage. This first stage processed paste is then further size reduced in a second stage in a homogenizing device, that is, in a homogenizer, of the type described at pages 1167–1168 of Perry's *Chemical Engineers Handbook* (3d edition).

In these homogenizers the paste under high pressure is forced through a restricted valve opening; the product develops a very high velocity as it passes through the small opening, and as a result, internal shear develops within the product tending to break down the particle size. Further size reduction occurs when the product impacts against a ring as it exits from the device.

With reference to FIG. 1 of the drawing, a typical homogenizer device for use herein comprises a nozzle 80 through which the first stage ground peanut paste is introduced. A valve 82 is in close relationship to the downstream exit of the nozzle 80 so as to restrict the egress of the peanut paste from the nozzle. Ordinarily the clearance between the valve and the downstream side of the nozzle is estimated to range from 0.005 inch to 0.04 inch for a nozzle having a diameter ranging from 0.05 inch to 2 inches and having a product throughput of 2 pounds/minute to 500 pounds/minute. The product flow through the nozzle 80 and past the valve 82 is indicated by arrows 83. As is indicated by the relationship of the nozzle 80 to valve 82 and by the arrows 83, the product is forced through the restricted annular opening between the valve 82 and the nozzle 80 and has its velocity increased thereby since exit reservoir 86 into which the product flows is at atmospheric pressure. Downstream of the beginning of the annular opening is an impact ring 84 against which the velocity-increased product stream 83 is impacted. At this point the product travels through reservoir 86 from whence it exits as proper particle size peanut paste 88.

The first-stage ground peanut paste is introduced into the nozzle and restricted opening in the homogenizer at a pressure ranging from 3,000 to 10,000 p.s.i.g., preferably ranging from 5,000 to 8,000 p.s.i.g. In the homogenizer the temperature of the peanut paste ranges from 50° to 300° F., preferably from 100° to 240° F. The velocity of the paste is increased in the homogenizer so as to range from about 500 ft./second to about 3,000 ft./second, preferably from about 600 ft./second to about 1,200 ft./second as a result of flowing through the previously referred to restricted annular opening under pressure. An optimum exit velocity is about 1,000 ft./second. As a result of this velocity increase through the restricted opening in the homogenizer, internal shear forces are set up within the peanut paste whereby the particles in the paste are further size reduced. Moreover, impact forces are applied to the paste when it impacts against the impact ring in the homogenizer, and these impact forces provide size reduction of paste particles.

In the homogenizer, the paste can be treated alone or in combination with other peanut butter ingredients such as stabilizers, emulsifiers, sweetener, salt, and any other ingredients. If the paste is treated in the homogenizer along with other ingredients, all the ingredients are mixed together but only the peanut paste has its particles size reduced.

The ingredients treated in the homogenizer are substantially free from water since the presence of even small amounts of water can lead to mold growth in the ultimate peanut butter product. Thus, the peanut treating process disclosed in Mitchell, U.S. Pat. No. 2,511,119 is entirely unsuitable for use herein.

As previously indicated, in the homogenizer size reduction occurs in a single pass in addition to a first grinding stage while other commonly used peanut comminuting devices either do not reduce peanut particle size sufficiently or require multiple passes in addition to a first grinding stage or overheat the treated material so that the flavor is deteriorated or require a large amount of elaborate extra cooling capacity to keep the temperature of treated material within prescribed limits. So far as cooling is concerned in the homogenizer process, no cooling is necessary. However, directly after the paste emits from the homogenizer a minor amount of cooling can be imparted in a cooling zone, for example, in a scraped wall heat exchanger; this cooling ordinarily only reduces the temperature of the paste by an increment of 30°–80° F. If cooling is imparted after the homogenization, care should be taken not to cool the mix emitting from the homogenizer, if it contains the stabilizer ingredients, to a temperature below the melting point of the stabilizer composition; this is because in further processing steps it is desired to cool the molten stabilizer in a particular way so that it crystallizes in proper fashion to provide proper stabilizing effect.

Attention is now directed to the embodiment of this invention where the novel particle-size peanut paste of this invention is utilized in a sweet peanut butter product. As previously indicated, a sweet peanut butter product comprises more than 3 percent by weight added sweetener and usually from 4–10 percent by weight added sweetener, preferably 5–7 percent. The preferred sweetening ingredient is sucrose. Because of the novel fine particle size of the peanut paste ingredient of this invention, it can be used in a sweet peanut butter product which is processed utilizing pumps and agitators that are the same as those utilized in the production of a peanut butter comprising conventional particle size peanut paste and only 1–3 percent by weight added sweetener. Thus, the present invention enables the conversion of a 1–3 percent added sweetener peanut butter system to the production of sweet peanut butter products without the replacement of the formerly used agitators and lower pressure pumps, or both 1–3 percent added sweetener and sweet products can be produced utilizing the same system. The added sweetener is conveniently admixed in the peanut butter product containing the paste of this invention by introducing it in the first-stage size reducer, that is, in the grinder, together with roasted peanuts or by introducing it by admixing it into paste resulting from the first-stage grinding or by introducing it by admixing it after the homogenization.

Because of the sweetness imparted by the use of more than 3 percent added sweetener in a peanut butter composition, and because of the fact that the homogenization step size reduces peanut skins to a degree such that they are not readily visible in the peanut butter product, greater than conventional amounts of peanut skins can be left on the roasted peanuts processed through the grinder and homogenizer to produce a more than 3 percent added sweetener product of acceptable speck count, that is appearance, and acceptable flavor. Thus the peanut butter product can contain more than 0.75 percent skins and even up to 5 percent skins, especially 2–4 percent skins, based on the weight of and as part of the peanut paste in the product in combination with more than 3 percent by weight especially 4–10 percent added sweetener by weight of the peanut butter product if the skins have been processed in the homogenizer together with the peanut paste.

The compositions herein, after being processed in the homogenizer, are then admixed with other optional ingredients if all the ingredients are not already in the product; then the product can be subjected to conventional processing to crystallize the stabilizer (treatment in a scraped wall heat exchanger and picker), filled into containers, and tempered, for example, in conventional fashion to produce a product ready for sale.

As previously indicated, the product is smoother, glossier, and melts more rapidly in the mouth than conventional peanut butter. The product with the high added sweetener content has these same qualities but is sweeter than peanut butter containing only 1–3 percent by weight added sweetener. The peanut butter product comprising the peanut paste of this invention and containing a normal amount of peanut skins, that is, no more than about 0.75 percent by weight of peanut skins, has a better appearance, that is, fewer specks, than conventional peanut butter. A peanut butter product comprising the paste of this invention containing more than normal amounts of peanut skins has an appearance comparable to that of conventional peanut butter, that is, about the same or fewer specks as compared to conventional peanut butter.

The following example further illustrates the peanut paste ingredient of this invention, the method for preparing this peanut paste ingredient in a homogenizer, the manufacture of a sweet peanut butter product comprising the peanut paste ingredient of this invention, and the manufacture of a peanut butter product comprising novel particle-size peanut paste in combination with more than the normal amounts of peanut skins and also in combination with more than 3 percent by weight added sweetener.

EXAMPLE a peanut butter composition is prepared containing the following percentages by weight of ingredients:

| Ingredients | Percent by Weight |
| --- | --- |
| Peanut paste | 90.0 |
| Salt | 1.2 |
| Sucrose | 5.8 |
| Molasses | 0.5 |
| Soybean monoglycerides | 0.7 |
| Rapeseed oil (IV=2) | 0.56 |
| Soybean oil (IV*=2) | 0.84 |
| Soybean oil (IV*=107) | 0.40 |
| | 100.00 |

*IV stands for Iodine Value

In the above peanut butter composition the peanut paste ingredient contains peanut skins amounting to 0.5 percent of its own weight. The peanut paste has a maximum particle size of 80 microns and contains 70 percent of its particles in the 8–20 micron range. About 5 percent of its particles are in the less than 8-micron size range and about 25 percent of its particles are in the 20–80 micron size range. 25 percent of its particles have a size less than 10 microns.

The above peanut butter composition is smoother and glossier and melts more quickly in the mouth than conventional peanut butter, that is, peanut butter containing conventional particle-size peanut paste. The above peanut butter composition has a significantly better appearance than conventional peanut butter in that it contains significantly fewer specks than conventional peanut butter. Furthermore, the above peanut butter composition is not stickier than conventional peanut butter; in other words, it does not stick to the roof of the mouth when eaten.

Figure 2:
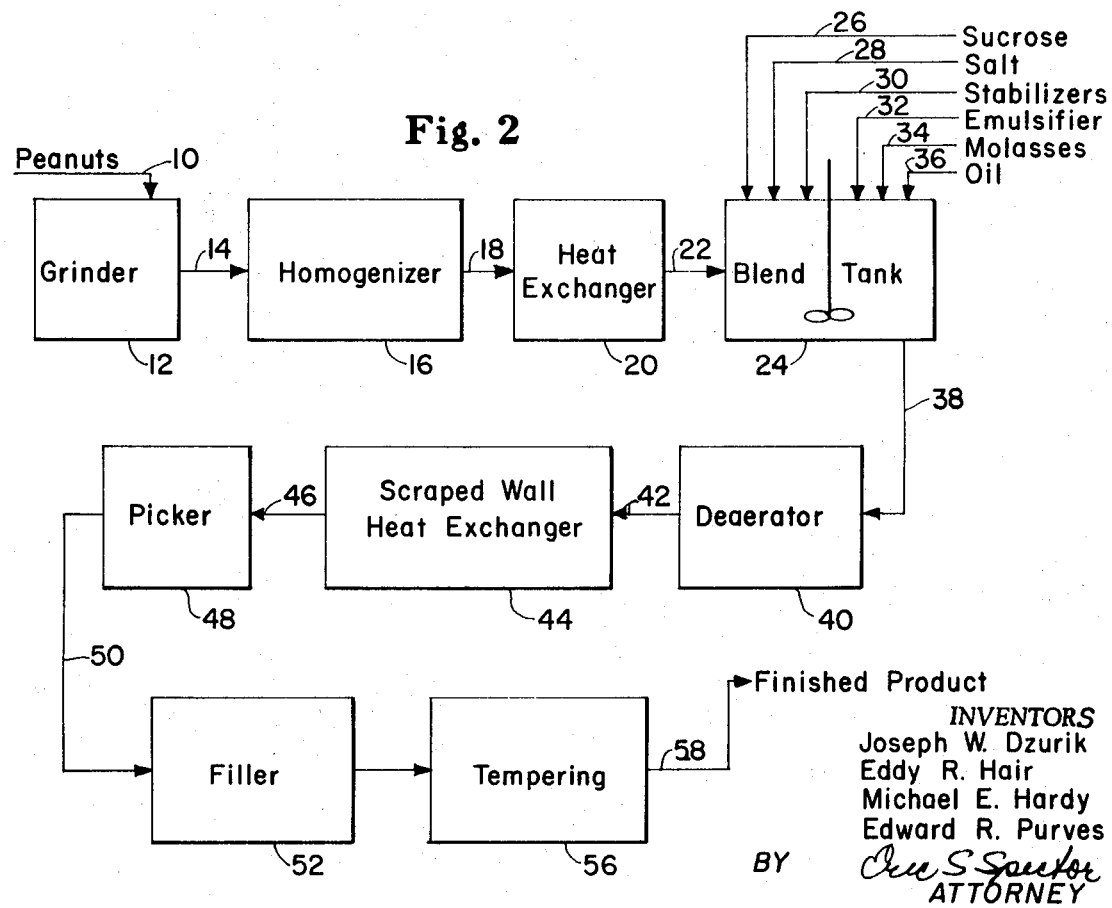
FIG. 2 is a flow diagram of a peanut butter preparation process utilized in the example herein.

The above peanut butter composition is prepared as follows: With continuing reference to FIG. 2 of the drawing, 270 pounds of roasted, blanched peanuts containing 0.5 weight percent peanut skins is fed at a rate of 660 pounds/hour via peanut feed line 10 into a conventional peanut grinder 12. In this grinder 12 the peanuts are size reduced to the particle size of conventional peanut paste, that is, to have a maximum particle size of about 250 microns and to have 45 percent of its particles in the 8–20 micron range. Just previous to the time the peanuts enter grinder 12, they are blanketed with nitrogen, and this nitrogen blanketing of the main processing stream is continued throughout the peanut butter manufacturing process through the filling step described hereinafter.

The ground peanuts, that is the peanut paste emitting from grinder 12, has a temperature of 180° F. It is fed via line 14 at a rate of 660 pounds/hour into homogenizer 16.

Homogenizer 16 is the type of device depicted in FIG. 1 of the drawing. With reference to FIG. 1, the nozzle 80 has an inside diameter of one-eighth inch, the clearance between nozzle 80 and valve 82 is about 0.018 inch, and impact ring 84 is one-sixteenth inch from the inside circumference of the downstream side of nozzle 80. The 660 pounds/hour of peanut paste entering homogenizer 16 enters nozzle 80 under a pressure of 7,000 p.s.i.g. As it emits from the downstream side of nozzle 80 and passes through the clearance between valve 82 and nozzle 80, it has its velocity increased to a value calculated to be 975 feet/second. In the homogenizer 16, the peanut paste, including the skins therein, is further size reduced. More particularly, the peanut paste exiting from homogenizer 16 has a maximum particle size of 80 microns and has 70 percent of its particles in the 8–20 micron range and 25 percent of its particles with a size less than 10 microns. About 5 percent of its particles are in the less than 8-micron size range and about 25 percent of its particles are in the 20–80 micron size range. The temperature of the peanut paste exiting from homogenizer 16 is 220° F.

The peanut paste emitting from homogenizer 16 is fed via line 18 into shell-and-tube heat exchanger 20. The paste is fed through heat exchanger 20 at a rate of 660 pounds/hour. The residence time of the peanut paste in the heat exchanger 20 is about 15 seconds. In the heat exchanger 20 the temperature of the peanut paste is reduced to 150° F.

The 270 pounds of cooled peanut paste is then fed via line 22 at a rate of 660 pounds/hour into batch blend tank 24 which is equipped with an agitator. Into blend tank 24 are also fed 17.4 pounds of sucrose sweetener, 3.6 pounds of salt, 4.2 pounds of stabilizers (a combination of rapeseed oil hydrogenated to an iodine value of 2 and soybean oil hydrogenated to an iodine value of 2 in a weight proportion of 3:2 soybean oil to rapeseed oil), 2.1 pounds of soybean monoglyceride emulsifier, 1.5 pounds of molasses, and 1.2 pounds of soybean oil hydrogenated to an iodine value of 107. The sucrose, 30, 32, stabilizer, emulsifier, molasses and oil ingredients are separately fed into blend tank 24 as represented by arrows 26, 28, 30, 34, and 36, respectively. In the blend tank 24 the 300 pounds of ingredients are mixed for 15 minutes. After the mixing, The resulting homogeneous peanut butter mixture has a temperature of 150° F.

This homogeneous mixture is then fed via line 38 at a rate of 330 pounds/hour into conventional deaerator 40 wherein any residual air is abstracted from the product so as to minimize the chance of rancidification of glyceride oil in the ultimate peanut butter product.

From the deaerator 40 the peanut butter mixture is pumped through scraped wall heat exchanger 44. The residence time of the peanut butter mixture in this scraped wall heat exchanger is 20 seconds. In the scraped wall heat exchanger 44 the peanut butter mixture has its temperature lowered to 86° F.

The cooled mixture is then fed via line 46 into an agitation zone, and more particularly, into a conventional picker 48. In the picker 48 the peanut butter mixture is agitated. It has a residence time in the picker of 2 minutes. This agitation and the residence time in the picker causes the stabilizer in the peanut butter mixture to crystallize in proper fashion. The temperature of the peanut butter mixture is raised about 5° F. due to the heat of crystallization of the stabilizer.

From the picker the mixture is pumped via line 50 into filler 52 which introduces the mixture into containers. The containers are transported to a tempering room 56 where the peanut butter is tempered by being maintained in the containers for 2 days at 80° F. to 90° F. After the tempering, finished product 58 is ready for sale.

This finished product is a sweet peanut butter product and has the composition and advantages enumerated in the beginning of this example.

In another case this sweet peanut butter product is prepared as above except that the peanut paste emitting from the conventional peanut grinder is fed into an agitated blend tank. The sucrose, salt, stabilizer, emulsifier, molasses and oil ingredients are separately fed into the blend tank. These ingredients are agitated in the blend tank to provide a homogeneous mixture. This homogeneous mixture is then fed through the homogenizer at a rate of 660 pounds/hour under a pressure of 7,000 p.s.i.g. In the homogenizer, the peanut paste, including the skins therein, is further size reduced; the other ingredients are not size reduced. The mixture having been treated in the homogenizer is passed through a scraped wall heat exchanger to reduce its temperature to 150° F. The resulting mixture is then subjected to deaerating, cooling, picking, filling, and tempering operations as above to produce finished product.

In another case, a peanut butter composition is prepared having the above-described formulation except that it contains by weight 1.7 percent sucrose instead of 5.8 percent sucrose, and 1 percent honey instead of 0.5 percent molasses; the difference in the amount of added sweetener is made up by the use of an equal weight of additional soybean oil that has been partially hydrogenated. This composition is processed in the same manner as above. The resulting composition has all the advantages enumerated above except that it tastes with respect to sweetness similar to a peanut butter product containing 1-3 percent added sweetener rather than to a sweet peanut butter product.

In another case, a peanut butter composition is prepared having the formulation the same as that in the first two paragraphs of this example except that the peanut paste ingredient contains 4 percent peanut skins instead of 0.5 percent peanut skins. The composition is prepared in the same way as the 0.5 percent peanut-skin-containing composition is prepared. Due to the homogenization process the peanut butter has an appearance which is as good as the appearance of conventional peanut butter in that it contains the same amount or fewer specks than conventional peanut butter has. In addition, the product has an acceptable taste, despite the fact that a bitter taste is normally associated with the use of high amounts of peanut skins, because of the presence of the high amounts of sweetener, that its, the 5.8 percent sucrose and 0.5 percent molasses. In addition, just as above, the product is smoother, glossier, and melts more rapidly in the mouth than conventional peanut butter.

Other sweeteners, for example, honey, dextrose, or fructose, can be utilized in the above example instead of sucrose or molasses and equal results of smoothness, glossiness and rapid mouth melt without excessive stickiness are obtained in the finished product.

What is claimed is:

1. A peanut butter composition comprising from 70 to 99 percent peanut paste including more than 0.75 percent and up to 5 percent of peanut skins based on the weight of the peanut paste ingredient, from 1 to 5 percent stabilizer, from 0.5 to 1.5 percent emulsifier, and from 4 to 10 percent added sweetener, said peanut paste ingredient having a maximum particle size of no more than 80 microns, having more than 50 percent of its particles with a particle size in the 8-20 micron range, and having no more than 35 percent of its particles having a size less than 10 microns.

2. The peanut paste ingredient of claim 1 wherein the paste has at least 55 percent of its particles with a particle size in the 8-20 micron range, and has no more than 30 percent of its particles having a size less than 10 microns.

3. The peanut butter composition of claim 2 comprising by weight from 5 to 7 percent added sweetener.

4. The peanut butter composition of claim 3 wherein sweetener is selected from the group consisting of sucrose, molasses, honey, dextrose, and fructose.

5. The peanut butter composition of claim 3 wherein the stabilizer component comprises substantially fully hydrogenated soybean oil and substantially fully hydrogenated rapeseed oil in weight ratios from about 3 to about 7:3 and the emulsifier is soybean monoglyceride.

6. The peanut butter composition of claim 2 wherein the skins range in amount from 2 to 4 percent based on the weight of the peanut paste ingredient.

7. A process for preparing a peanut paste ingredient for a peanut butter composition which is smoother, glossier, has fewer specks and melts more rapidly in the mouth than conventional peanut butter and which has acceptable stickiness characteristics, said process comprising the step of passing peanut paste initially having a maximum particle size on the order of 150 to 300 microns and initially having 40 to 50 percent of its particles in the 8-20 micron range through a homogenizer having an inlet nozzle and mounted in close relationship to the downstream exit of the nozzle a valve plug which restricts egress of product from the nozzle and forms an annular opening between the nozzle and the valve plug, and mounted downstream from the annular opening between the nozzle and the valve plug an impact ring against which product can be impacted prior to entering a product reservoir from which homogenized product is withdrawn, to reduce the particle size to the levels specified in claim 1, the paste being introduced into the nozzle of the homogenizer at a pressure ranging from 3,000 to 10,000 p.s.i.g., the temperature of the peanut paste in the homogenizer ranging from 50° to 300° F.

8. The process of claim 7 wherein the paste has its particle size reduced to the level specified in claim 2.

9. The process of claim 8 wherein the pressure ranges from 5,000 to 8,000 p.s.i.g. and the peanut paste temperature ranges from 100° to 240° F.

10. The process of claim 9 wherein the velocity of the paste is increased in the homogenizer so as to range from about 500 feet/second to about 3,000 feet/second.

11. The process of claim 10 wherein peanut skins are part of the peanut paste and amount to more than 0.75 percent and up to 5 percent by weight of the peanut paste.

12. The process of claim 10 wherein the peanut paste is passed through the homogenizer in combination with stabilizer, emulsifier, and sweetener ingredients.

13. Introducing peanut paste in a radially outwardly extending manner at a pressure of from 3,000 to 10,000 p.s.i.g. into a homogenizing zone wherein said paste is subjected to impacting and internal shearing forces to provide a peanut paste ingredient having a maximum particle size of no more than 80 microns, having more than 50 percent of its particles with a particle size in the 8-20 micron range, and having no more than 35 percent of its particles having a size less than 10 microns.

14. The process of claim 13 wherein the paste has at least 55 percent of its particles with a particle size in the 8-20 micron range, and has no more than 30 percent of its particles having a size of less than 10 microns.

* * * * *